(12) United States Patent
Su et al.

(10) Patent No.: US 7,450,798 B2
(45) Date of Patent: Nov. 11, 2008

(54) AUTOMATIC SHUTDOWN SYSTEM AND METHOD FOR OPTICAL MULTIPLEXERS AND DEMULTIPLEXERS

(75) Inventors: Jun Su, San Jose, CA (US); Yi Ding, Milpitas, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 11/781,007

(22) Filed: Jul. 20, 2007

(65) Prior Publication Data
US 2008/0013885 A1  Jan. 17, 2008

Related U.S. Application Data

(62) Division of application No. 10/921,561, filed on Aug. 19, 2004, now Pat. No. 7,280,717.

(51) Int. Cl.
*G02B 6/12* (2006.01)
*G02B 6/26* (2006.01)
*G02B 6/42* (2006.01)
*G02B 6/34* (2006.01)

(52) U.S. Cl. .............. 385/16; 385/14; 385/31; 385/37

(58) Field of Classification Search .............. 385/16
See application file for complete search history.

(56) References Cited

U.S. PATENT DOCUMENTS

| 6,785,434 B2 | 8/2004 | Castoldi et al. |
| 6,928,209 B2 | 8/2005 | Su et al. |
| 2002/0191886 A1 | 12/2002 | Castoldi et al. |
| 2004/0161188 A1 | 8/2004 | Su et al. |

*Primary Examiner*—Frank G Font
*Assistant Examiner*—Mary A El Shammaa
(74) *Attorney, Agent, or Firm*—Marshall, Gerstein & Borun LLP

(57) ABSTRACT

An automatic shutdown system for optical multiplexers and demultiplexers includes an optical switch that is disposed in a common optical channel between a transmitter and a receiver of an optical communication system. The optical switch may attenuate or block a signal in the common optical channel during power-off conditions. The optical switch may also provide a low insertion loss and low polarization loss in the common optical channel during power-on conditions.

10 Claims, 3 Drawing Sheets

AUTOMATIC SHUTDOWN SYSTEM AND METHOD FOR OPTICAL MULTIPLEXERS AND DEMULTIPLEXERS

RELATED APPLICATION DATA

This application is a divisional application of U.S. Ser. No. 10/921,561 filed Aug. 19, 2004.

FIELD OF THE DISCLOSURE

The present disclosure generally relates to optical communication, and more particularly, to an automatic shutdown system and method for optical multiplexers and demultiplexers.

BACKGROUND OF THE DISCLOSURE

Multi-channel optical signals are typically multiplexed at a source with an optical multiplexer (MUX) for transmission to a destination on a common optical transmission line. Prior to the transmission being received by the destination, an optical demultiplexer (DMUX) demultiplexes the transmission back to the multi-channel optical signals. Prior to multiplexing the multi-channel signals at the transmission source, a variable optical attenuator (VOA) may be used for each channel to regulate or attenuate the optical power of each channel. Additionally, a VOA may be used for each channel after being demultiplexed at the destination to regulate or attenuate the optical power of each channel.

To provide system safety, each VOA can be typically set to its maximum attenuation value or a certain configurable attenuation value in case of electrical power failure. This feature is called Automatic VOA Shutdown (AVS). The AVS feature is typically implemented in each VOA. However, because high attenuation is required for each VOA in a power-off condition, high electrical power has to be provided to sustain regular attenuation during power-on conditions. Supplying high electrical power to each VOA can cause heat generation in each VOA that can lead to thermal management, which may become a significant problem when a high number of optical channels are present.

DETAILED DESCRIPTION

Figure 1:
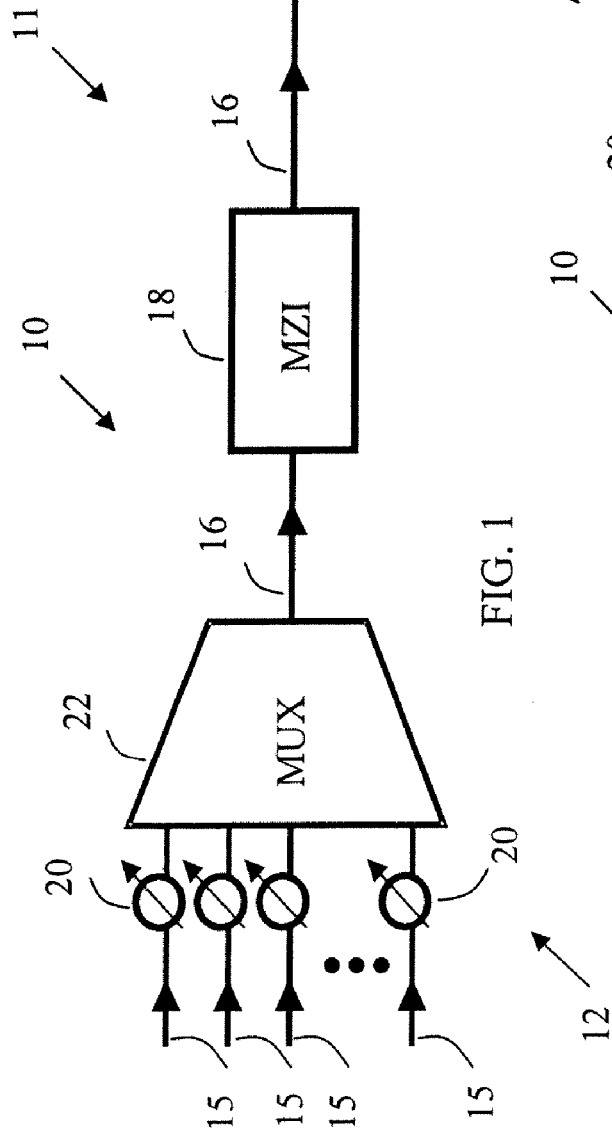
FIG. 1 is a schematic diagram of a transmitter of an optical communication system having an automatic shutdown system and method constructed in accordance with the teachings of the present disclosure.
Figure 2:
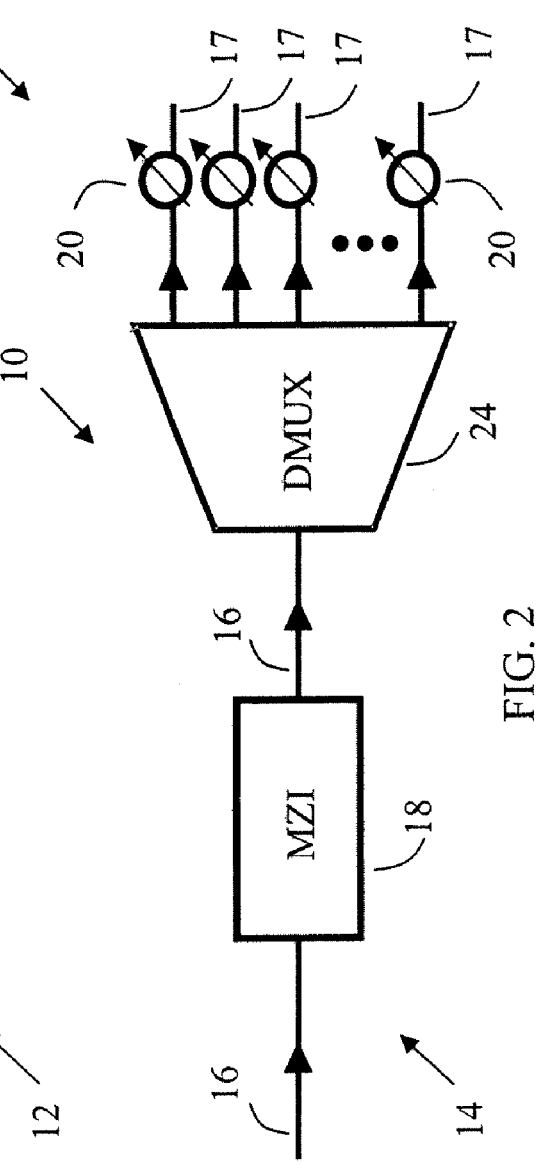
FIG. 2 is a schematic diagram of a receiver of an optical communication system having an automatic shutdown system and method constructed in accordance with the teachings of the present disclosure.

Referring to FIGS. 1 and 2, an automatic shutdown system 10 for optical multiplexers and demultiplexers constructed in accordance with the teachings of the present disclosure is generally shown. The automatic shutdown system 10 may be part of an optical communication system 11 (shown collectively by FIGS. 1 and 2) that includes a transmitter 12 and a receiver 14. The transmitter 12 multiplexes one or more input optical channels 15 into a common optical channel 16 for transmission to the receiver 14. The common optical channel 16 is demultiplexed by the receiver into one or more output optical channels 17. The optical communication system further includes one or more optical switches 18 that can attenuate or block a signal in the common optical channel 16 during power-off conditions. The one or more optical switches 18 can also provide a low insertion loss and low polarization-dependent loss in the common optical channel 16 during power-on conditions. The switch 18 may be disposed in the common optical channel 16 either downstream of the transmitter 12 or upstream of the receiver 14. Certain optical communication systems 11, however, may require two or more switches 18 disposed in the common optical channel 16 between the transmitter 12 and the receiver 14.

Referring to FIGS. 1 and 2, the transmitter 12 and the receiver 14 may be in close proximity to each other. For example, each of the transmitter 12 and the receiver 14 may be integral with one or more components of a computer system. Alternately, the transmitter 12 and the receiver 14 may be components of a long distance communication system, such as systems that provide communication between distant geographic regions. The transmitter 12 includes one or more variable optical attenuators (VOA) 20 that attenuate each of the optical input channels 14. The attenuation of each optical input channel 15 by each VOA 20 regulates the optical power of each input channel 15. Accordingly, a VOA 20 may not be required for an optical input channel 15 that operates with low optical power, and conversely, a VOA 20 may be required for an optical input channel that operates with high optical power.

After attenuation of the optical input channels 15, an optical multiplexer (MUX) 22 multiplexes the input channels 15 to provide the common optical channel 16. At the receiver 14, an optical demultiplexer (DMUX) 24 receives the common optical channel 16 and demultiplexes the common optical channel 16 into the plurality of the output optical channels 17. One or more variable optical attenuators (VOA) 20 attenuate the signals in the output optical channels 17. The VOA's 20 that are upstream of the MUX 22 and those that are downstream of the DMUX 24 may have similar or different characteristics. For sake of brevity, however, the VOA's 20 that are upstream of the MUX 22 and the VOA's 20 that are downstream of the DMUX 24 are given the reference number 20. The VOA's 20 that are downstream of the DMUX 24 balance the signals in the output optical channels 17 to adjust the output power of the output optical channels 17. Each VOA 20 may be constructed with one or more Mach-Zehnder Interferometers.

Figure 3:
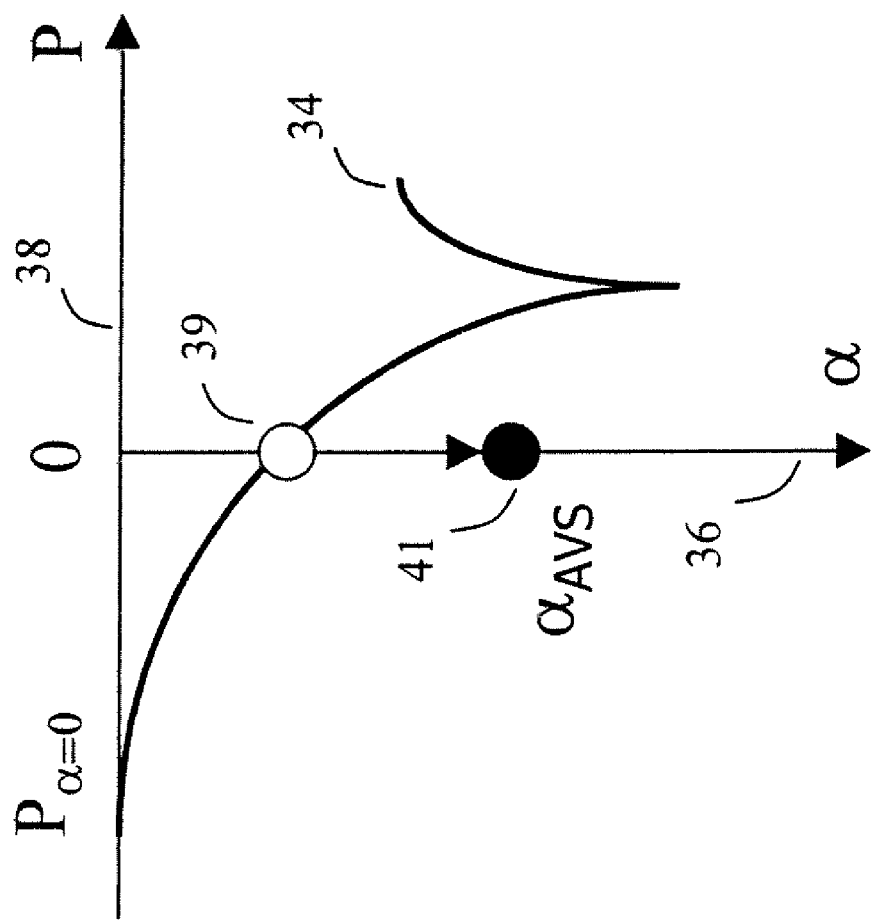
FIG. 3 is a graph showing an optical attenuation curve for the transmitter of FIG. 1 or the receiver of FIG. 2 during power-on and power-off operation.

Referring to FIG. 3, the attenuation characteristics of the VOA's 20 are graphically shown with an attenuation curve 34. An attenuation level α, which is graphically represented by an attenuation axis 36, is plotted against the level of electrical power P, which is graphically represented by a power axis 38. In absence of electrical power, the attenuation of the VOA's 20 is $\alpha_{AVS}$, which is the maximum attenuation the VOA's 20 can provide when not powered. The maximum attenuation of the VOA's 20 is shown in FIG. 3 by a hollow circle 39. Such maximum attenuation provides optical safety for the optical communication system 11 in case of electrical failure. Accordingly, each VOA 20 provides automatic attenuation during electrical failure. The VOA's automatic shutdown feature during power-off operation is referred to herein as the automatic VOA shutdown condition (AVS condition). Conversely, the power-on condition is referred to herein as the non-AVS condition.

To provide a higher value of $\alpha_{AVS}$ during an AVS condition, the VOA's 20 have to be designed so that the position of $\alpha_{AVS}$ is lower on the attenuation axis 36. However, to lower the position of the $\alpha_{AVS}$, on the attenuation axis 36, the attenuation curve 34 has to be shifted to the left so that a lower point on the attenuation curve 34 intersects the attenuation axis 36. As shown by the attenuation curve 34, the higher the attenuation is for the VOA's 20 during an AVS condition (i.e., P=0), the more electrical power is required to sustain lower attenuation values during a non-AVS condition. As shown in FIG. 3, when $\alpha_{AVS}$ increases, the power at zero attenuation that is shown by $P_{\alpha=0}$ also increases.

Referring back to FIGS. 1 and 2, to provide a higher $\alpha_{AVS}$ without requiring higher electrical power during normal operation, the optical communication system 11 constructed in accordance with the teachings of the present disclosure includes one or more optical switches 18. During an AVS condition, the optical switch 18 provides high attenuation or blocking of the optical signal. During a non-AVS condition, however, the optical switch 18 provides a low insertion loss and low polarization-dependent loss. The optical switch 18 may be positioned immediately downstream of the MUX 22 as shown in FIG. 5. Alternately, the optical switching system 18 may be positioned immediately upstream of the DMUX 24, as shown in FIG. 6. Additionally, two or more switches 18 can be provided such that one is disposed immediately downstream of the MUX 22, a second is disposed immediately upstream of the DMUX 24, and one or more switches 18 are disposed between the MUX 22 and the DMUX 24 along the common optical channel 16.

The optical switch 18 can be constructed with devices and methods that are known to those of ordinary skill in the art for providing the herein described switching functionality. For example, the optical switching device 18 can be a variable optical attenuator with attenuation or signal blocking characteristics during AVS conditions and low insertion loss and low polarization-dependent loss characteristics during non-AVS conditions. In yet another example, the optical switch 18 can be a mechanically actuated optical switch. In the disclosed examples, however, the optical switch 18 is constructed with a Mach-Zehnder Interferometer (MZI). Accordingly, the optical switching mechanism 18 is also referred to herein as the MZI 18. The MZI 18 may be designed to provide such high attenuation so as to highly attenuate or substantially block the optical signals in the common optical channel 16 during an AVS condition. While the MZI 18 provides high attenuation or blocking during an AVS condition, it provides low insertion loss and low polarization-dependent loss in the common optical channel 16 during a non-AVS condition.

Referring to FIG. 3, because during a non-AVS condition the MZI 18 has low insertion loss and low polarization loss and does not attenuate the optical signal in the common optical channel 16, the characteristics of the attenuation curve 34 are similar to when the MZI 18 is not disposed in the common optical channel 16. Accordingly, the intersection of the attenuation curve 34 with the attenuation axis 36 represents the $\alpha_{AVS}$ for an AVS condition in the absence of the MZI 18 during the AVS condition, which is shown by the hollow circle 39. The MZI 18 provides high signal attenuation or blocking during an AVS condition. Accordingly, the MZI 18 provides an $\alpha_{AVS}$ during an AVS condition, as shown by the filled circle 41 on the attenuation axis 36, that is higher than the $\alpha_{AVS}$ represented by the hollow circle 39. Because the MZI 18 provides attenuation or blocking of the optical signals in the common optical channel 16 during AVS conditions, the attenuation level of the VOA's 20 during AVS conditions may be lowered. Accordingly, by using the MZI 18 in the optical communication system 11, the VOA's 20 will consume less power during non-AVS conditions thereby producing less heat.

As described above, the optical communication system 11 can be used for communication by optical signals between long distances, such as between two distant cities. To facilitate such communication, it may be necessary to provide signal amplification at several points between the MUX 22 and the DMUX 24. Because power failure may occur at each of the noted amplification points, the disclosed AVS system 10 may be implemented at various points along the communication system to provide the disclosed AVS feature. Accordingly, the disclosed AVS may be necessary at the MUX 22, the DMUX 24, and several points between the MUX 22 and the DMUX 24 if necessary. Thus, the optical communication system 18 may include two or more MZI's 18.

The optical communication system 11 can be used for communication by optical signals between short distances, such as communication between two components of a computer system. Accordingly, each or both of the MUX 22 and the DMUX 24 can include an MZI 18. As shown in FIG. 1, only the MUX 22 can include an MZI 18. Alternately, as shown in FIG. 2, only the DMUX 22 can include an MZI 18. Alternately yet, each of the MUX 22 and the DMUX 24 can be constructed as having a corresponding MZI 18.

Figure 4:
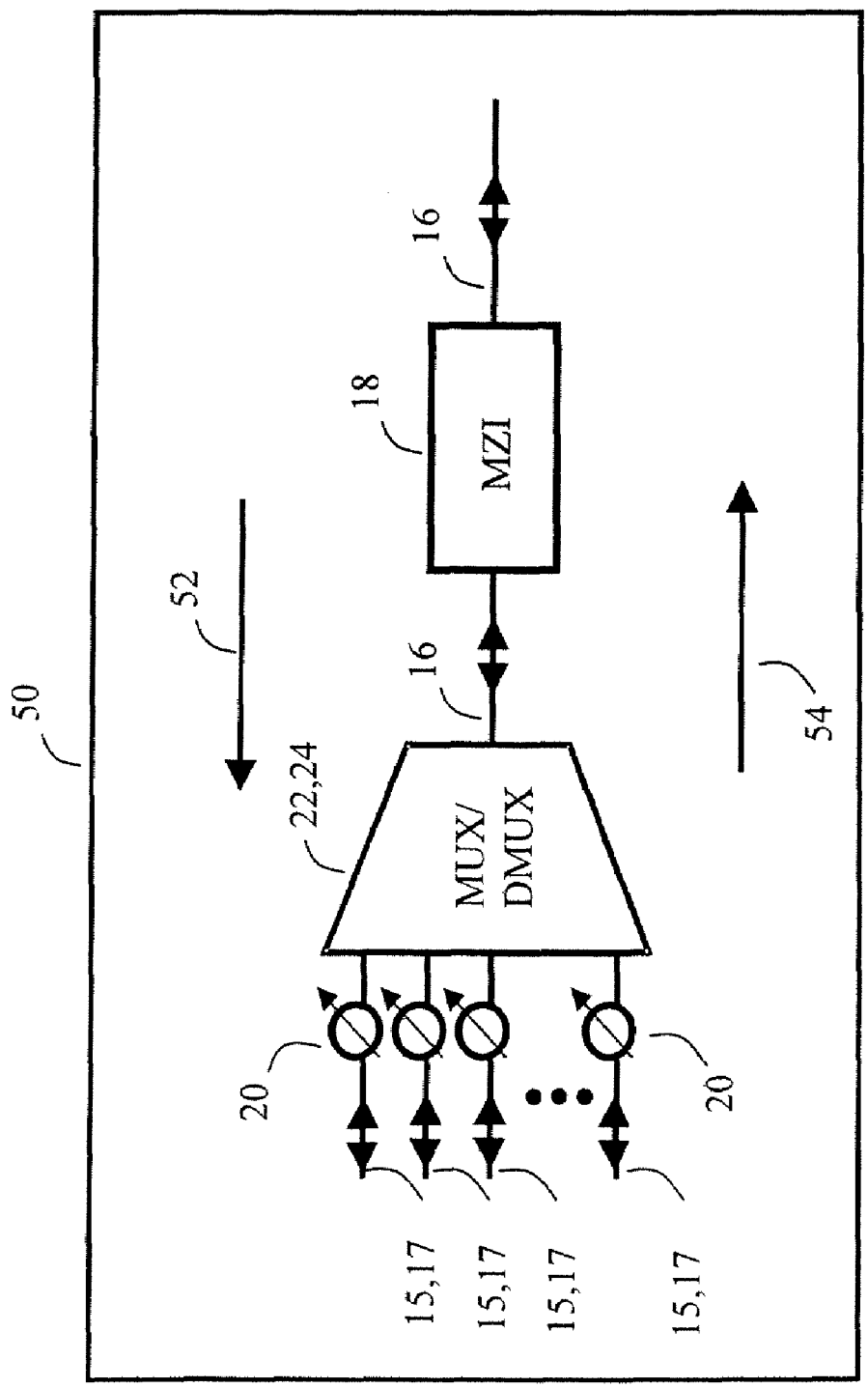
FIG. 4 is a schematic diagram of a transceiver having an automatic shutdown system and method constructed in accordance with the teachings of the present disclosure.

Referring to FIG. 4, in accordance with one embodiment of the invention, a transceiver 50 having the disclosed automatic shutdown system 10 is generally shown. The transceiver 50 functions similar to the above-described receiver 14 when the optical transmission is in the direction of the arrow 52. The transceiver 50 functions similar to the above-described transmitter 12 when the optical transmission is in the direction shown by the arrow 54. Accordingly, the above-described components, functionality and operations of the receiver 14 and the transmitter 12 are equally applicable to the transceiver 50. During a non-AVS condition the MZI 18 has low insertion loss and low polarization loss and does not attenuate the optical signal in the common optical channel 16. However, the MZI 18 provides high signal attenuation or blocking during an AVS condition. Therefore, because the MZI 18 provides attenuation or blocking of the optical signals in the common optical channel 16 during AVS conditions, the attenuation level of the VOA's 20 during AVS conditions may be lowered. Accordingly, by using the MZI 18 in the transceiver 50, the VOA's 20 will consume less power during non-AVS conditions thereby producing less heat.

In at least one or more embodiments of the invention, as shown schematically by FIGS. 1, 2 and 4, the optical communication components can be constructed as Planar Lightwave Circuits (PLC). In a PLC, Arrayed Waveguide Grating (AWG) can provide the multiplexing and demultiplexing functions of the MUX 22 and DMUX 24, respectively. When manufacturing the PLC on a silicon die, one or more MZI's 18 can also be manufactured on the same die as being part of the MUX 22, the DMUX 24, or both, to provide the above-described switching functionality in an integral package. The MZI 18 may be structurally similar to the VOA's 20 but configured to include the above-described characteristics. Depending on the type of optical communication system being used, an MZI 18 can be added to the output port of the AWG in the MUX 22. Alternately, or in addition, an MZI 18 can be added to the input port of the AWG in the DMUX 24.

The MZI 18 can be manufactured from polymeric materials to provide incorporation thereof on the PLC. The thermo-optic coefficient in polymers, which is defined as a derivative of refractive index with temperature, has a large negative value, i.e., $-10^{-4}/C.°$ for glassy polymers. When fabricating the PLC to provide the AWG, a polymeric material can be embedded in the PLC to provide the switching functionality of the MZI 18. The polymer waveguide is fabricated in such a way that during a non-AVS condition, the polymer waveguide's refractive index matches the refraction index of silica-on-silicon. Accordingly, the MZI 18 will provide a low insertion loss and low polarization-dependent loss during the Non-AVS condition. When electrical power fails, i.e., AVS condition, the refractive index of the polymer drops, thereby resulting in the polymer waveguide becoming leaky. Accordingly, the MZI 18 will provide high attenuation or blocking during the AVS condition.

Although the teachings of the present disclosure have been illustrated in connection with certain examples, there is no intent to limit the present disclosure to such examples. On the contrary, the intention of this application is to cover all modifications and examples fairly falling within the scope of the teachings of the present disclosure.

What is claimed is:

1. A method of automatic shutdown for an optical communication system, the method comprising:
   attenuating at least one or more optical input channels at variable attenuation levels at power-on conditions;
   attenuating the plurality of optical input channels at a power-off attenuation level at power-off conditions;
   multiplexing the plurality of optical input channels into a common optical channel; and
   attenuating the common optical channel during the power-off conditions, the attenuating of the common optical channel during the power-off conditions being at a higher level than the power-off attenuation level of the plurality of optical input channels.

2. The method of claim 1, wherein attenuating the common optical channel comprises blocking the common optical channel during power-off conditions.

3. The method of claim 1, wherein the common optical channel operating in a low insertion loss mode during the power-on conditions.

4. The method of claim 1, wherein the attenuating of the common optical channel is provided by an optical switch.

5. The method of claim 1, wherein the attenuating of the common optical channel is provided by a Mach-Zehnder Interferometer.

6. The method of claim 5, further comprising switching the Mach-Zehnder Interferometer between the attenuating of the common optical channel during power-off conditions and a power-on mode of operation during power-on conditions, wherein the power-on mode of operation of the Mach-Zehnder Interferometer provides a low insertion loss in the common optical channel.

7. The method of claim 5, wherein the switching of the Mach-Zehnder Interferometer is provided by a material having a negative thermo-optic coefficient.

8. The method of claim 1, further comprising multiplexing the plurality of optical input channels through an arrayed waveguide grating disposed on a Planar Lightwave Circuit (PLC).

9. The method of claim 8, further comprising attenuating the common optical channel through a Mach-Zehnder Interferometer integrally disposed with the arrayed waveguide grating on the PLC.

10. The method of claim 8, wherein the Mach-Zehnder Interferometer is formed of polymeric material embedded in the PLC, and such that during the power-on conditions the refractive index of the polymer material matches the refractive index of silica-on-silicon to provide a low insertion loss and low polarization-dependent loss during the power-on conditions.

* * * * *